(12) United States Patent
Nemoto et al.

(10) Patent No.: US 11,342,863 B2
(45) Date of Patent: May 24, 2022

(54) INVERTER DEVICE FOR PERFORMING A POWER CONVERSION OPERATION TO CONVERT DC POWER TO AC POWER

(71) Applicant: HITACHI AUTOMOTIVE SYSTEMS, LTD., Hitachinaka (JP)

(72) Inventors: Takuya Nemoto, Hitachinaka (JP); Toshiyuki Ajima, Tokyo (JP); Taito Kikuchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/268,802

(22) PCT Filed: Jul. 25, 2019

(86) PCT No.: PCT/JP2019/029153
§ 371 (c)(1),
(2) Date: Feb. 16, 2021

(87) PCT Pub. No.: WO2020/044890
PCT Pub. Date: Mar. 5, 2020

(65) Prior Publication Data
US 2021/0242799 A1 Aug. 5, 2021

(30) Foreign Application Priority Data
Aug. 30, 2018 (JP) .............................. JP2018-161419

(51) Int. Cl.
*H02M 7/539* (2006.01)
*H02M 7/5395* (2006.01)
(Continued)

(52) U.S. Cl.
CPC ....... *H02M 7/5395* (2013.01); *H02M 1/0003* (2021.05); *H02M 7/483* (2013.01); *H02P 27/08* (2013.01); *H02P 23/0027* (2013.01)

(58) Field of Classification Search
CPC ....... H02M 1/12; H02M 1/0003; H02P 27/08; H02P 23/0027
See application file for complete search history.

(56) References Cited

U.S. PATENT DOCUMENTS

| 4,615,000 A | * | 9/1986 | Fujii | ................. H02M 7/53873 318/811 |
| 5,321,599 A | * | 6/1994 | Tanamachi | ............ H02M 7/487 363/41 |

(Continued)

FOREIGN PATENT DOCUMENTS

| JP | 2003-319662 A | 11/2003 |
| JP | 2012-070497 A | 4/2012 |

(Continued)

OTHER PUBLICATIONS

International Search Report with English translation and Written Opinion issued in corresponding application No. PCT/JP2019/029153 dated Nov. 5, 2019.

*Primary Examiner* — Yusef A Ahmed
(74) *Attorney, Agent, or Firm* — Foley & Lardner LLP

(57) ABSTRACT

An inverter performs a power conversion operation for converting DC power into AC power, includes an arithmetic control device provided with a voltage command signal generation unit, a synthesis processing unit, and a carrier wave comparison unit. The voltage command signal generation unit has a plurality of control systems, and outputs the first voltage command signal generated based on the first control system among the plurality of control systems, and the second voltage command signal generated based on the second control system different from the first control system among the plurality of control systems. The synthesis processing unit generates a synthesized voltage command signal obtained by synthesizing the first voltage command signal and the second voltage command signal at a prede- (Continued)

termined ratio. The carrier wave comparison unit generates a PWM signal which is a gate drive signal for controlling the power conversion operation based on the synthesized voltage command signal.

6 Claims, 12 Drawing Sheets

(51) Int. Cl.
*H02M 1/00* (2006.01)
*H02M 7/483* (2007.01)
*H02P 27/08* (2006.01)
*H02P 23/00* (2016.01)

(56) References Cited

U.S. PATENT DOCUMENTS

| | | | | |
|---|---|---|---|---|
| 5,923,728 | A * | 7/1999 | Ikkai | B60L 15/2045 318/807 |
| 6,768,284 | B2 * | 7/2004 | Lee | H02P 21/36 318/808 |
| 8,547,716 | B2 * | 10/2013 | Yoneda | H02J 3/383 363/98 |
| 9,281,774 | B2 * | 3/2016 | Yamada | H02P 21/0089 |
| 10,250,171 | B2 * | 4/2019 | Yamakawa | H02P 6/10 |
| 10,411,621 | B2 * | 9/2019 | Hara | B62D 5/0463 |
| 2004/0201358 | A1 * | 10/2004 | Kawaji | H02P 25/092 318/701 |
| 2010/0123418 | A1 * | 5/2010 | Itoh | H02P 21/0089 318/400.02 |
| 2010/0219780 | A1 * | 9/2010 | Morimoto | H02P 21/0089 318/400.02 |
| 2011/0074320 | A1 * | 3/2011 | Nakamura | H02P 21/0089 318/400.02 |
| 2012/0056569 | A1 * | 3/2012 | Takamatsu | B60L 15/08 318/400.26 |
| 2012/0173066 | A1 * | 7/2012 | Yamada | H02P 21/18 701/22 |
| 2012/0323430 | A1 * | 12/2012 | Nakamura | B60L 50/51 701/22 |
| 2014/0049198 | A1 * | 2/2014 | Ooyama | H02M 1/12 318/400.09 |
| 2014/0225547 | A1 * | 8/2014 | Yokozutsumi | H02P 6/28 318/400.27 |
| 2015/0180382 | A1 * | 6/2015 | Hamada | H02P 27/085 318/722 |
| 2015/0311835 | A1 * | 10/2015 | Hara | H02P 21/06 318/400.02 |
| 2016/0072424 | A1 * | 3/2016 | Yokozutsumi | H02P 27/14 318/503 |
| 2016/0190971 | A1 * | 6/2016 | Yamakawa | H02P 27/08 318/504 |
| 2016/0211790 | A1 * | 7/2016 | Ajima | H02P 27/08 |
| 2017/0063253 | A1 * | 3/2017 | Fukumaru | H02M 7/5395 |
| 2017/0317620 | A1 * | 11/2017 | Yamamoto | H02P 27/085 |
| 2018/0026569 | A1 * | 1/2018 | Yoshimura | H02M 7/537 290/31 |
| 2018/0145582 | A1 * | 5/2018 | Shuai | H02M 1/32 |
| 2018/0183378 | A1 * | 6/2018 | Tsubota | H02M 1/08 |
| 2018/0212541 | A1 * | 7/2018 | Li | H02P 21/0014 |
| 2019/0253014 | A1 * | 8/2019 | Iwaji | H02M 7/48 |
| 2020/0119678 | A1 * | 4/2020 | Hoshino | H02P 21/18 |
| 2020/0220481 | A1 * | 7/2020 | Hayashi | H02M 7/53871 |
| 2020/0389117 | A1 * | 12/2020 | Takaoka | H02P 23/0027 |
| 2020/0395758 | A1 * | 12/2020 | Tanaka | H02J 3/36 |
| 2021/0044225 | A1 * | 2/2021 | Kwon | H02P 5/74 |

FOREIGN PATENT DOCUMENTS

| | | |
|---|---|---|
| JP | 2014-143831 A | 8/2014 |
| JP | 6062327 B2 | 1/2017 |

* cited by examiner

INVERTER DEVICE FOR PERFORMING A POWER CONVERSION OPERATION TO CONVERT DC POWER TO AC POWER

TECHNICAL FIELD

The present invention relates to an inverter device.

BACKGROUND ART

PTL 1 below is known as a background art in this technical field. PTL 1 discloses an inverter device that includes a PWM pulse generation unit that generates a PWM pulse for converting a DC voltage to an AC voltage based on a motor output request and an inverter circuit that converts the DC voltage to the AC voltage by the PWM pulse generated by the PWM pulse generation unit and drives the motor. The PWM pulse generation unit changes any one of a center point interval of an on-pulse of a plurality of PWM pulses in an angle section in which a zero cross point of the output voltage is linearly approximated, and a center point interval of an off-pulse based on the motor output request so as to generate a PWM pulse.

CITATION LIST

Patent Literature

PTL 1: JP 6062327 B1

SUMMARY OF INVENTION

Technical Problem

According to the inverter device described in PTL 1, an output voltage error and a phase error of the inverter circuit can be reduced, but there is room for improvement in suppressing the torque fluctuation generated when the control system is switched.

Solution to Problem

An inverter device according to the present invention performs a power conversion operation to convert DC power to AC power. The inverter device includes a voltage command signal generation unit that includes a plurality of control systems and outputs a first voltage command signal generated based on a first control system among the plurality of control systems and a second voltage command signal generated based on a second control system different from the first control system among the plurality of control systems, a synthesis processing unit that generates a synthesized voltage command signal obtained by synthesizing the first voltage command signal and the second voltage command signal at a predetermined ratio, and a carrier wave comparison unit that generates a signal for controlling the power conversion operation based on the synthesized voltage command signal.

Advantageous Effects of Invention

According to the present invention, torque fluctuations that occur when switching control systems can be suppressed.

DESCRIPTION OF EMBODIMENTS

Figure 1:
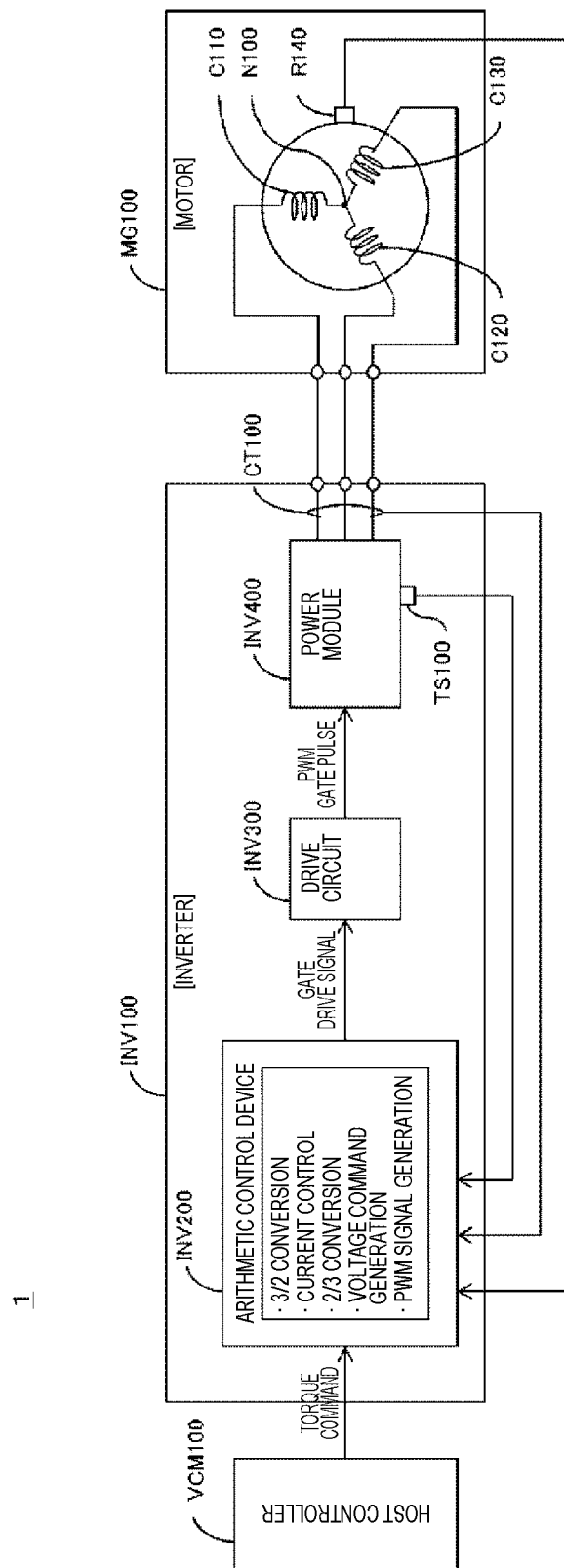
FIG. 1 is a diagram illustrating the configuration of a rotary electric motor drive system which includes an inverter device according to an embodiment of the present invention.

Hereinafter, embodiments of the present invention will be described with reference to the drawings. However, the present invention is not interpreted in a limited way to the following embodiments, and the technical idea of the present invention may be realized in combination with other known components. Further, the same element in the drawings will be attached with the same symbol, and the redundant description will be omitted.

FIG. 1 is a diagram illustrating the configuration of a rotary electric motor drive system including an inverter device according to an embodiment of the present invention. A rotary electric motor drive system 1 illustrated in FIG. 1 includes a motor MG100, an inverter INV100, and a host controller VCM100. The inverter INV100 corresponds to the inverter device according to an embodiment of the present invention.

The motor MG100, which is a rotary electric motor, is, for example, a three-phase AC motor having connection structure. The motor MG100 includes au-phase coil winding C110, a V-phase coil winding C120, and a W-phase coil winding C130, and generates a driving force by rotating a rotor (not illustrated) which rotates by a rotating magnetic field generated when a predetermined AC current flows in these coil winding. The U-phase coil winding C110, the V-phase coil winding C120, and the W-phase coil winding C130 are connected at a common neutral point N100. The motor MG100 is provided with a rotation angle sensor R140 that detects the rotation angle of the rotor.

The motor MG100 uses a battery (not illustrated) configured by a secondary battery such as a lithium ion battery or a nickel hydrogen battery as a power source, and a drive current is supplied by the inverter INV100. The inverter INV100 includes an arithmetic control device INV200, a drive circuit INV300, and a power module INV400.

The power module INV400 includes a plurality of power semiconductor switching elements that form a U-phase arm, a V-phase arm, and a W-phase arm, respectively. The U-phase arm corresponds to the U-phase coil winding C110, the V-phase arm corresponds to the V-phase coil winding C120, and the W-phase arm corresponds to the W-phase coil winding C130. The power module INV400 controls the on/off timing of each switching element based on a PWM gate pulse signal which is input as a drive signal from the drive circuit INV300. As a result, the DC power supplied from the two-phase power lines connected to the positive and negative electrodes of the battery is converted into three-phase AC power, and the AC power is supplied to t three-phase lines connected to the coil windings of the motor MG100. A current sensor CT100 is attached to the wiring provided between the power module INV400 and the motor MG100, and the current sensor CT100 detects the current flowing through each coil winding of the motor MG100. Further, a temperature sensor TS100 is attached to the power module INV400, and the temperature sensor TS100 detects the temperature in the vicinity of the switching element.

The arithmetic control device INV200 generates a gate drive signal (operation command) for controlling a switching timing of each switching element of the power module INV400 based on a torque command input from the host controller VCM100 or input information from each of the rotation angle sensor R140, the current sensor CT100, and the temperature sensor TS100. The arithmetic control device INV200 outputs the generated gate drive signal to the drive circuit INV300. The drive circuit INV300 generates a PWM gate pulse signal based on the gate drive signal (operation command) input from the arithmetic control device 11.4V200, and outputs the PWM gate pulse signal to the power module INV400.

The arithmetic control device INV200 includes a microcomputer for arithmetically processing the switching timing of each switching element. The input information to the microcomputer includes a target torque value required for the motor MG100, a current value flowing through each coil winding of the motor MG100, a rotation angle of the rotor of the motor MG100, a temperature of the power module INV400, and the like. The target torque value is given by the torque command input from the host controller VCM100. Information on the current value of each coil winding, the rotation angle of the rotor, and the temperature of the power module INV400 is input from the rotation angle sensor R140, the current sensor CT100, and the temperature sensor TS100, respectively. The host controller VCM100 corresponds to a vehicle controller that controls the entire vehicle, for example, if the motor MG100 is a motor for traveling the vehicle.

The microcomputer of the arithmetic control device INV200 performs the following arithmetic, for example. First, the current command values for the d-axis and the q-axis of the motor MG100 are calculated based on the target torque value input from the host controller VCM100. Next, the current values of the d-axis and the q-axis are calculated based on the current value of each coil winding input from the current sensor CT100 and the rotation angle of the rotor input from the rotation angle sensor R140. Then, the difference between the current command values and the current values of the d-axis and the q-axis is calculated, and the voltage command values of the d-axis and the q-axis are calculated based on this difference. Then, the calculated voltage command values of the d-axis and the q-axis are converted into the voltage command values of U-phase, V-phase, and W-phase based on the rotation angle of the rotor input from the rotation angle sensor R140. Then, the modulated wave based on the obtained voltage command values of U-phase, V-phase, and W-phase is compared with the preset carrier wave (triangle wave), and PWM modulation is performed based on the comparison result to generate a pulse shape PWM signal (PWM pulse). The arithmetic control device INV200 outputs the PWM signal thus generated to the drive circuit INV300 as a gate drive signal for controlling the power conversion operation performed by the power module INV400.

The drive circuit INV300 amplifies the gate drive signal input from the arithmetic control device INV200 and outputs it as a PWM gate pulse signal to each switching element of the power module INV400. As a result, each switching element of the power module INV400 is made to perform a switching operation, and a power conversion operation from DC power to three-phase AC power is performed.

Next, a method of determining the control system in the arithmetic control device INV200 will be described. In the arithmetic control device INV200, when performing PWM modulation, the generated PWM signal can be changed by selecting one from a plurality of control systems and using the modulated wave corresponding to the selected control system. At this time, the control system that can be selected by the arithmetic control device INV200 includes, for example, a sinusoidal PWM control system that uses a normal sine wave as a modulated wave, and a third harmonic superimposition PWM control system that uses a sine wave superimposed with a third harmonic as a modulated wave, an overmodulation PWM control system that uses a trapezoidal wave as a modulated wave, a rectangular wave control system that uses a rectangular wave as a modulated waves, and the like. The control system that can be selected by the arithmetic control device INV200 may include other control systems.

Here, an example of the processing executed by the arithmetic control device INV200 will be described. The arithmetic control device INV200 first performs current arithmetic processing. In the current arithmetic processing, the torque value indicated by the torque command input from the host controller VCM100 and the current rotation speed of the motor MG100 are collated with a current command map held in the arithmetic control device INV200. The current command map is map information regarding the operating state of the motor MG100, and represents the relationship between the torque, the rotation speed, and the current of the motor MG100 preset by actual measurement or simulation. The current command map is stored and held in, for example, a memory (not illustrated) in the arithmetic control device INV200. By using this current command map, it is possible to calculate the current required for the motor MG100 to output the torque required by the torque command. The current rotation speed of the motor MG100 can be calculated based on the temporal change of the rotation angle of the rotor input from the rotation angle sensor R140.

Next, the arithmetic control device INV200 obtains the voltage to be output to the motor MG100 by performing current-voltage conversion when the required current is obtained by the current arithmetic processing. Subsequently, the arithmetic control device INV200 calculates a modulation factor by performing modulation factor calculation. In the modulation factor calculation, the voltage obtained by the current-voltage conversion is compared with the DC voltage of the battery, and the modulation factor is obtained from these ratios.

When the modulation factor is obtained, the arithmetic control device INV200 performs control system determination to determine the control system. In the control system determination, the control system to be used when generating the PWM modulated wave is determined by selecting one of a plurality of preset control systems based on the modulation factor obtained by the modulation factor calculation. For example, when the modulation factor is 1.00 or less, the sinusoidal PWM control system is selected, and when the modulation factor is more than 1.00 and 1.15 or less, the third harmonic superimposition PWM control system is selected. If the modulation factor is more than 1.15 and less than 1.27, the overmodulation PWM control system is selected, and if the modulation factor is 1.27, the rectangular wave control system is selected.

After the control system is determined by the control system determination, the arithmetic control device INV200 generates a voltage command signal using the modulated wave corresponding to the control system, and performs PWM modulation using this voltage command signal to generate a PWM signal. As a result, the arithmetic control device INV200 controls the motor MG100 using the control system selected based on the modulation factor.

Figure 2:
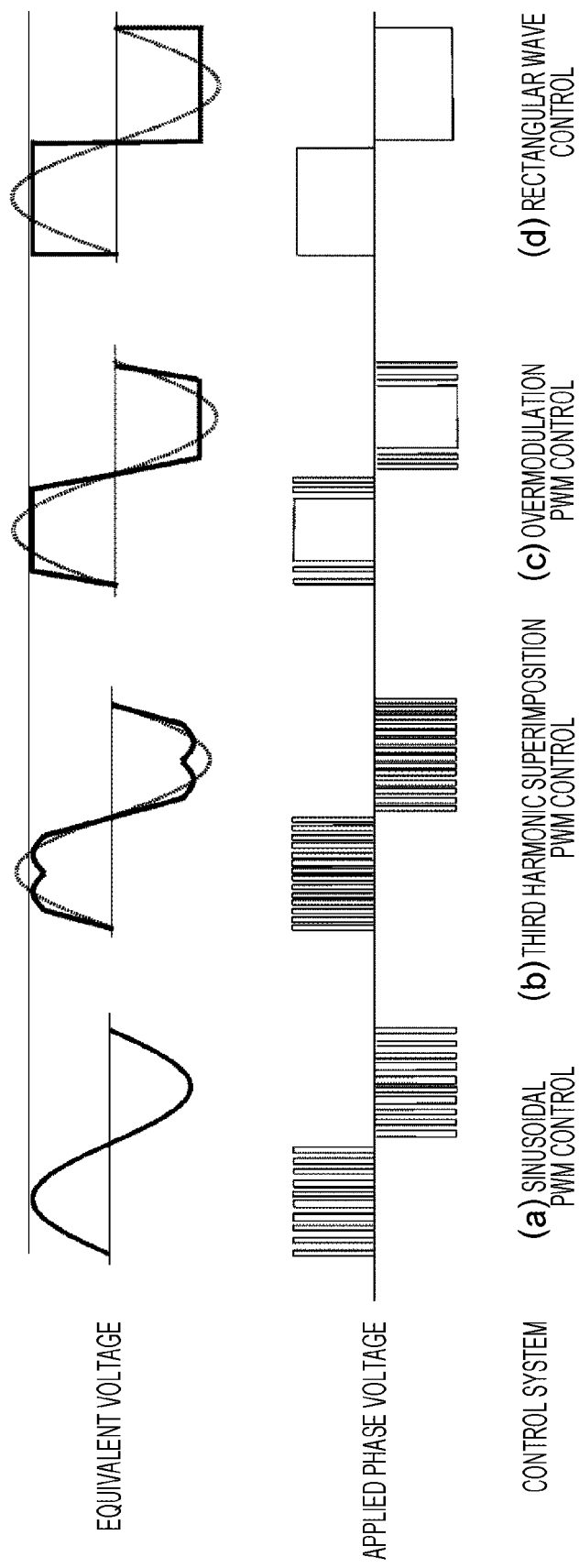
FIG. 2 is a comparison diagram of a control system.

FIG. 2 is a comparison diagram of the above control systems. The sinusoidal PWM control system illustrated in FIG. 2(a) is characterized in that the harmonic component of the generated current is smaller than that of other control systems. By adopting this method, the noise when the motor MG100 is rotated is less than that of other control systems, and the motor efficiency is also good. However, on the other hand, there is a weakness that the DC voltage utilization rate is the lowest.

The third harmonic superimposition PWM control system illustrated in FIG. 2(b) utilizes the characteristic of three-phase AC that the line voltage is not affected even if the same voltage fluctuation is applied to all phases, and the voltage utilization rate is improved without increasing the current harmonic by superimposing the third harmonic of the current fundamental wave on the sine wave. In the above example, the sinusoidal PWM control system is selected when the modulation factor is 0 to 1, and the third harmonic superimposition PWM control system is selected when the modulation factor is 1 to 1.15. However, either one of the sinusoidal PWM control system or the third harmonic superimposition PWM control system may be used when the modulation factor is 0 to 1. In the following description, it may be referred to as sinusoidal PWM control including the third harmonic superimposition PWM control.

The overmodulation PWM control system illustrated in FIG. 2(c) is characterized in that the PWM pulses generated as the modulation factor increases become denser, so that multiple PWM pulses are combined and the ON period continues.

The rectangular wave control system illustrated in FIG. 2(d) is the control system adopted when the modulation factor is 1.27, and is characterized by having the highest DC voltage utilization rate. However, compared to the above three control systems, there is a weakness that current harmonics increase.

In the rotary electric motor drive system 1 mounted on the vehicle, when the motor MG100 is controlled by the inverter INV100, the control system is necessarily switched appropriately according to the modulation factor in order to realize an optimum motor control according to the driving condition of the vehicle. However, in general, when the control system is switched, the torque becomes discontinuous and the torque fluctuates. Torque fluctuations cause discomfort to the occupants of the vehicle and is necessarily suppressed as much as possible.

Therefore, in the inverter INV100 of this embodiment, the arithmetic control device INV200 synthesizes the voltage command signals generated by the two control systems when the control systems are switched. Then, PWM modulation is performed using the synthesized voltage command signal to generate a PWM signal. In the following, the details will be described.

Figure 3:
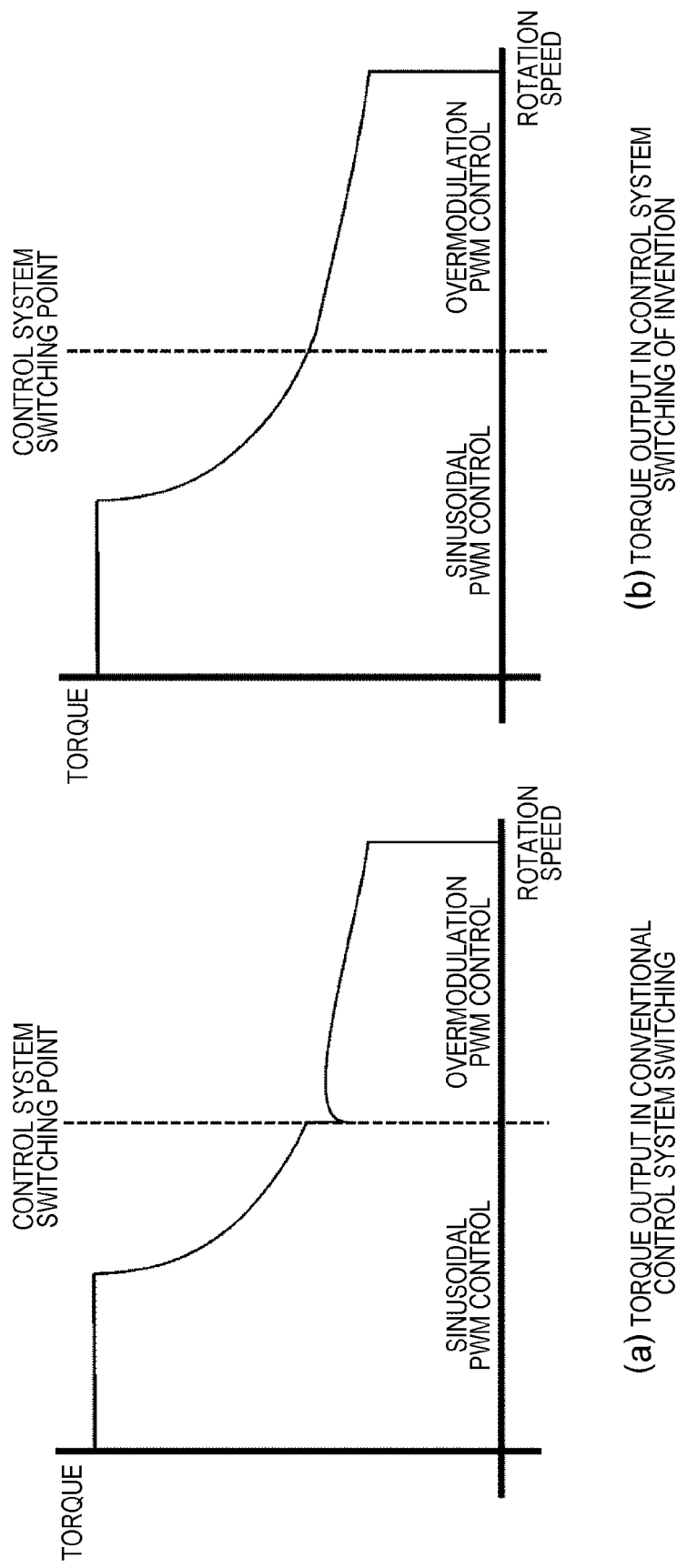
FIG. 3 is a diagram illustrating a comparative example of torque outputs of a conventional control system switching and the control system switching by the present invention.

FIG. 3 is a diagram illustrating a comparative example of the torque output of conventional control system switching and control system switching according to the present invention. FIG. 3 illustrates an example of the torque output in the case of switching the control system from the sinusoidal PWM control system to the overmodulation PWM control system, or conversely from the overmodulation PWM control system to the sinusoidal PWM control system according to the modulation factor which is changed as the rotation speed of the motor MG100 increases or decreases. However, the same is true even in a case where the switching is performed between other control systems.

FIG. 3(a) is a schematic diagram of the torque output from the motor MG100 when the conventional control system switching is performed in the inverter INV100. As illustrated in FIG. 3(a), when the torque command is given to maintain the maximum torque from low rotation to high rotation, the output torque of the motor MG100 suddenly fluctuates at the switching point of the control system in the conventional control system switching in a case where the rotation speed of the motor MG100 is increased or decreased. This phenomenon is mainly caused by an error factor of each control system. That is, it is originally necessary to output the same torque from the motor MG100 before and after switching the control system. However, the inverter INV100 has different error factors for each control system, and thus when the control system is switched, PWM pulses that cause different voltage output results are generated from the same voltage command. As a result, even if the average voltage is the same, the instantaneous voltage output, that is, the PWM pulse output before and after the switching time of the control system changes suddenly. Therefore, at the switching time of the control system, the current flowing through the motor MG100 suddenly changes, which causes torque fluctuation.

As described above, the torque fluctuation of the motor MG100 at the time of switching the control system is caused by the fluctuation of the current flowing through the motor MG100. Therefore, even if the torque fluctuates when the control system is switched, the voltage command itself is corrected by the current feedback control immediately after the switching, so that the torque following the torque command can be output from the motor MG100 after a certain period of time.

FIG. 3(b) is a schematic diagram of the torque output from the motor MG100 when the control system switching of the present invention is performed in the inverter INV100. In the control system switching according to the present invention, as described above, when the control system is switched, the voltage command signals generated by the two control systems before and after the switching are synthesized, and PWM modulation is performed using the synthesized voltage command signal. By performing such PWM control during a certain switching period, the PWM signal is gradually shifted during the switching period. As a result, the sudden change in the current flowing through the motor MG100 can be alleviated, and the torque fluctuation can be alleviated and eliminated as illustrated in FIG. 3(b).

During the switching period in which PWM modulation is performed using the synthesized voltage command signal, torque fluctuation may occur due to the current value deviating from the command value. However, since the voltage command value is corrected so that the target current is output by the current feedback control, the torque fluctuation can be ideally eliminated. If torque fluctuation occurs during the switching period, the current feedback may be effective during the switching period and the torque fluctuation may be suppressed by lengthening the switching period.

Figure 4:
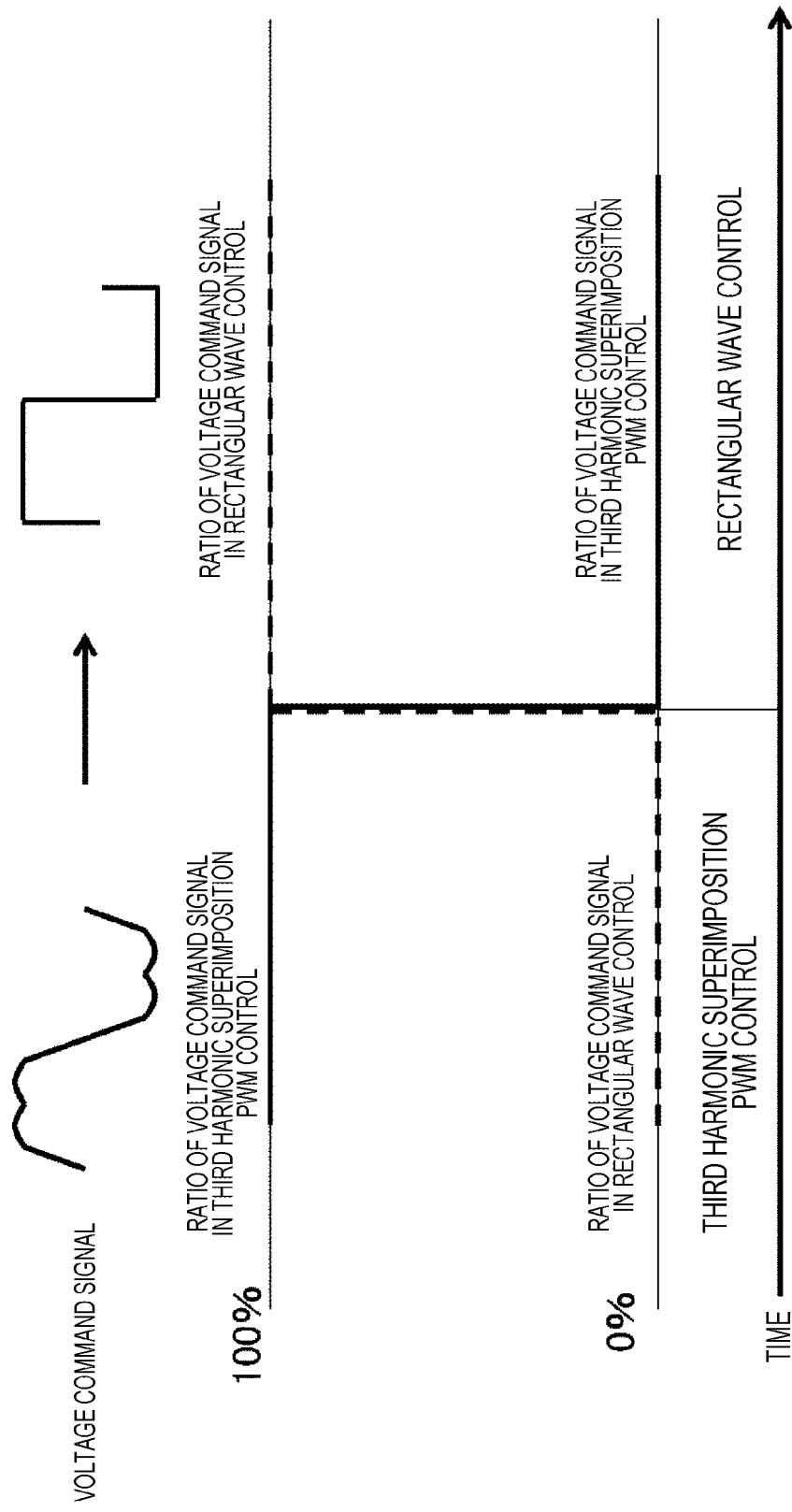
FIG. 4 is a diagram illustrating an example of a contribution rate to a final voltage output and a voltage command signal waveform of each control system in a case where the conventional control system switching is performed.
Figure 5:
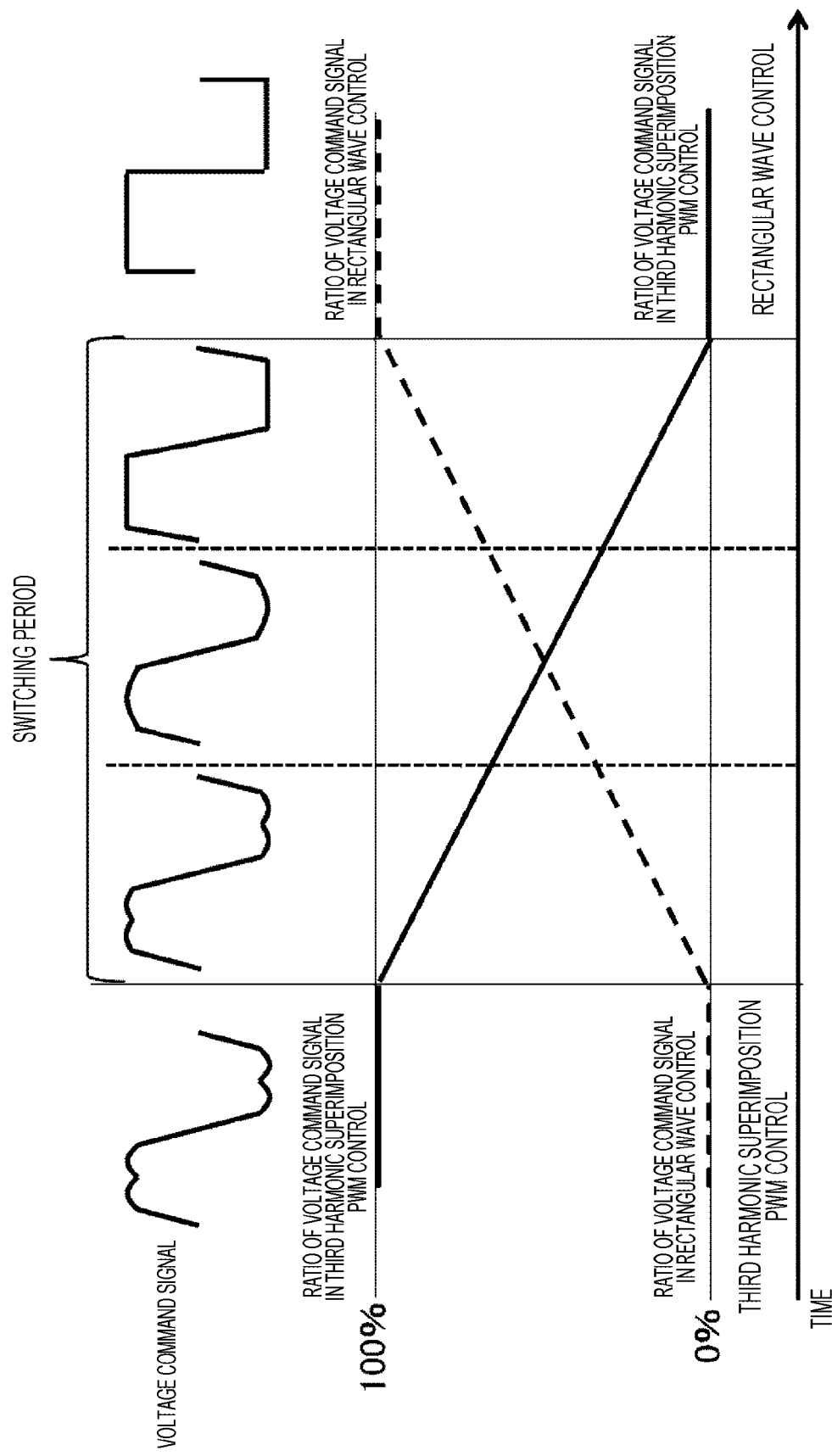
FIG. 5 is a diagram illustrating an example of a contribution rate to a final voltage output and a voltage command signal waveform of each control system in a case where the control system switching of the present invention is performed.

Next, changes in the voltage command signal during switching between the conventional control system switching and the control system switching according to the present invention will be described below with reference to FIGS. 4 and 5. FIGS. 4 and 5 illustrate examples of changes in the voltage command signal when switching from the third harmonic superimposition PWM control system to the rectangular wave control system. However, the same is true in a case where the switching is performed between other control systems.

FIG. 4 is a diagram illustrating an example of a contribution rate to a final voltage output and a voltage command signal waveform of each control system in a case where the conventional control system switching is performed. As illustrated in FIG. 4, in the conventional control system switching, when the modulation factor changes over a predetermined threshold, the control system is instantaneously switched with that point as the control switching point, and accordingly the waveform of the voltage command signal is also switched instantly. Here, the threshold of the modulation factor as the control switching point is set according to the range of the modulation factor determined for each control system as described above.

FIG. 5 is a diagram illustrating an example of the contribution rate to the final voltage output and the voltage command signal waveform of each control system in a case where IS the control system switching of the present invention is performed. As illustrated in FIG. 5, in the control system switching according to the present invention, there is a switching period between before and after switching. During this switching period, the voltage command signal generated by the third harmonic superimposition PWM control system, which is the control system before switching, and the voltage command signal generated by the rectangular wave control system, which is the control system after switching, are synthesized with a predetermined contribution rate so that the total voltage command signal becomes 100%. In the following description, the control system before switching may be called a "first control system", and the control system after switching may be referred to as a "second control system". Further, the voltage command signal generated by the first control system may be called a "first voltage command signal", and the voltage command signal generated by the second control system may be called a "second voltage command signal".

When synthesizing the first voltage command signal and the second voltage command signal, the contribution rate of the first voltage command signal is gradually reduced according to the elapse of the switching period, and the contribution rate of the second voltage command signal is gradually increased. With this configuration, in the control system switching according to the present invention, the voltage command signal gradually changes over time during the switching period, and the control system is continuously transferred. As a result, fluctuations in the voltage output due to switching of the control system can be suppressed, and torque fluctuations can be suppressed.

Further, the calculation that reflects the contribution rates in the first and second voltage command signals during the switching period is realized by, for example, multiplying the first voltage command signal by a variable coefficient of 0 or more and 1 or less and multiplying the second voltage command signal by a value obtained by subtracting the coefficient from and adding these multiplication results when the microcomputer sets a value for compare matching with the carrier wave in PWM modulation. Further, by decreasing this coefficient with time, the contribution rate of the first voltage command signal can be gradually reduced, and the contribution rate of the second voltage command signal can be gradually increased.

Figure 6:
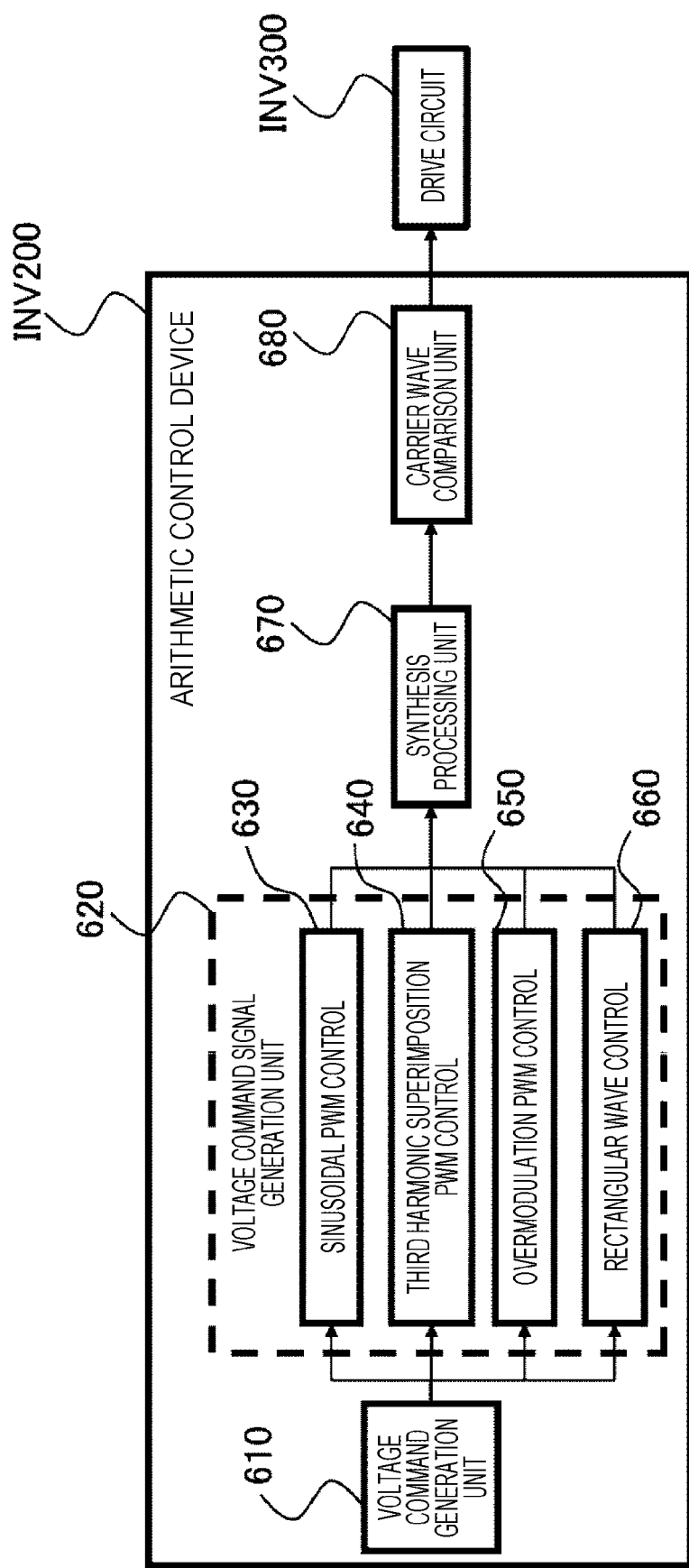
FIG. 6 is a block diagram of an arithmetic control device in the inverter device according to an embodiment of the present invention.

FIG. 6 is a block diagram of an arithmetic control device in the inverter device according to an embodiment of the present invention. As illustrated in FIG. 6, in the inverter INV100 of this embodiment, the arithmetic control device INV200 has functional blocks of a voltage command generation unit 610, a voltage command signal generation unit 620, a synthesis processing unit 670, and a carrier wave comparison unit 680. The arithmetic control device INV200 can realize these functional blocks by, for example, executing a predetermined program in the microcomputer.

The voltage command generation unit 610 generates a voltage command based on the target torque value input from the host controller VCM100 in FIG. 1, and outputs the voltage command to the voltage command signal generation unit 620. When the voltage command signal generation unit 620 receives the voltage command from the voltage command generation unit 610 and switches the control system, the voltage command signal generation unit 620 generates modulated waves by two control systems before and after the switching in a predetermined switching period, that is, the first and second control systems, and outputs the modulated waves to the synthesis processing unit 670 as the first and second voltage command signals. The synthesis processing unit 670 synthesizes these voltage command signals output from the voltage command signal generation unit 620 at a predetermined ratio to generate a synthesized voltage command signal, and outputs the synthesized voltage command signal to the carrier wave comparison unit 680. The carrier wave comparison unit 680 performs PWM modulation by comparing the synthesized voltage command signal generated by the synthesis processing unit 670 with a predetermined carrier wave, and generates a PWM signal. The PWM signal generated by the carrier wave comparison unit 680 is output from the arithmetic control device INV200 to the drive circuit INV300 as a gate drive signal, and is used for generating the PWM gate pulse signal performed by the drive circuit INV300.

The voltage command signal generation unit 620 has a plurality of control systems, and selects two control systems among them based on the voltage command from the voltage command generation unit 610. In the example of FIG. 6, the voltage command signal generation unit 620 has a total of four control systems, that is, a sinusoidal PWM control 630, a third harmonic superimposition PWM control 640, an overmodulation PWM control 650, and a rectangular wave control 660, and selects two control systems from these. The present invention is not limited to this, and other control systems may be selectable. Then, the two types of voltage command signals generated by the two selected control systems are output to the synthesis processing unit 670 as the first and second voltage command signals.

Specifically, the voltage command signal generation unit 620 uses, for example, the sinusoidal PWM control 630 as the first control system and the third harmonic superimposition PWM control 640 as the second control system in a case where the modulation factor changes in the increasing direction over 1.00. Similarly, when the modulation factor changes in the increasing direction over 1.15, the third harmonic superimposition PWM control 640 is selected as the first control system, and the overmodulation PWM control 650 is selected as the second control system. When the modulation factor increases to 1.27, the overmodulation PWM control 650 is selected as the first control system, and the rectangular wave control 660 is selected as the second control system. Further, for example, when the modulation factor changes in the decreasing direction over 1.00, the third harmonic superimposition PWM control 640 is selected as the first control system, and the sinusoidal PWM control 630 is selected as the second control system. Similarly, when the modulation factor changes in the decreasing direction over 1.15, the overmodulation PWM control 650 is selected as the first control system, and the third harmonic superimposition PWM control 640 is selected as the second control system. When the modulation factor decreases from 1.27, the rectangular wave control 660 is selected as the first control system, and the overmodulation PWM control 650 is selected as the second control system.

The voltage command signal generation unit 620 may select only one control system except during the switching period. In this case, the synthesis processing unit 670 may output the voltage command signal input from the voltage command generation unit 610 to the carrier wave comparison unit 680 as it is. Alternatively, as in the switching period, the voltage command signal generation unit 620 may generate two types of voltage command signals by selecting two control systems. In this case, only the other voltage command signal may be output to the carrier wave comparison unit 680 by setting the contribution rate of either one to 0 in the synthesis processing unit 670.

Figure 7:
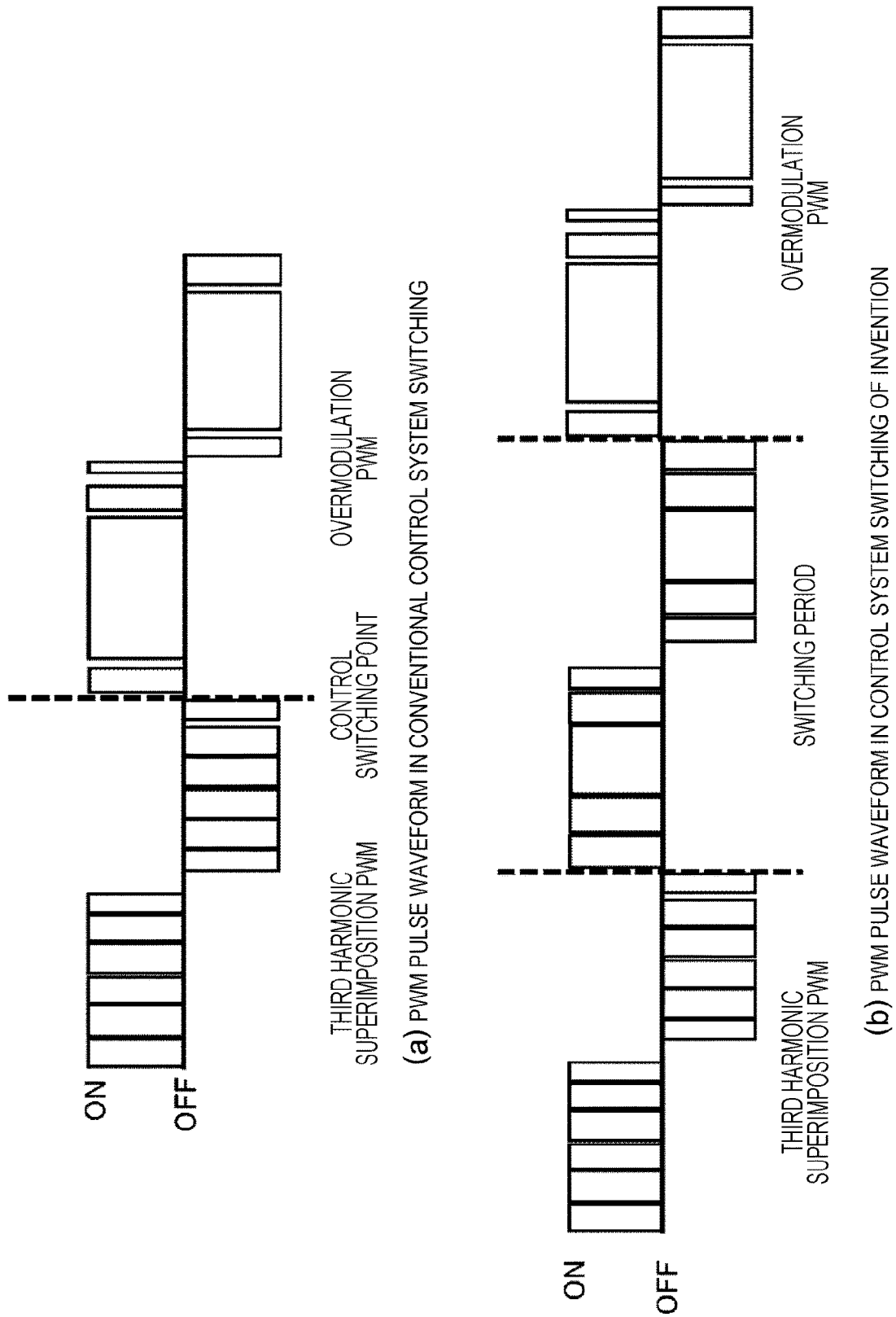
FIG. 7 is a diagram illustrating a comparative example of the PWM pulse waveforms of the conventional control system switching and the control system switching according to the present invention.

FIG. 7 is a diagram illustrating a comparative example of PWM pulse waveforms of the conventional control system switching and the control system switching according to the present invention. Further, FIG. 7 illustrates an example of the PWM pulse waveform when switching from the third harmonic superimposition PWM control system to the overmodulation PWM control system, or conversely, from the overmodulation PWM control system to the third harmonic superimposition PWM control system. However, the same is true even in a case where the switching is performed between other control systems.

FIG. 7(a) illustrates an example of the PWM pulse waveform when the conventional control system switching is performed. As illustrated in FIG. 7(a), in the conventional control system switching, the duty of the PWM pulse suddenly changes at the control switching point where the control system is switched. As described above, the control switching point corresponds to the timing at which the modulation factor changes over a predetermined threshold, and is set according to the range of the modulation factor determined for each control system.

FIG. 7(b) illustrates an example of the PWM pulse waveform when the control system switching according to the present invention is performed. As illustrated in FIG. 7(b), in the control system switching according to the present invention, the duty of the PWM pulse during the switching period is set to an arbitrary value between the duty of the PWM pulse in the first voltage command signal and the duty of the PWM pulse in the second voltage command signal. Here, the switching period in FIG. 7(b) includes the control switching point illustrated in FIG. 7(a), that is, the timing at which the modulation factor changes over a predetermined threshold. The length of the switching period can be arbitrarily determined, but it is preferable that the switching period is as short as possible within a range in which torque fluctuation can be sufficiently eliminated.

Figure 8:
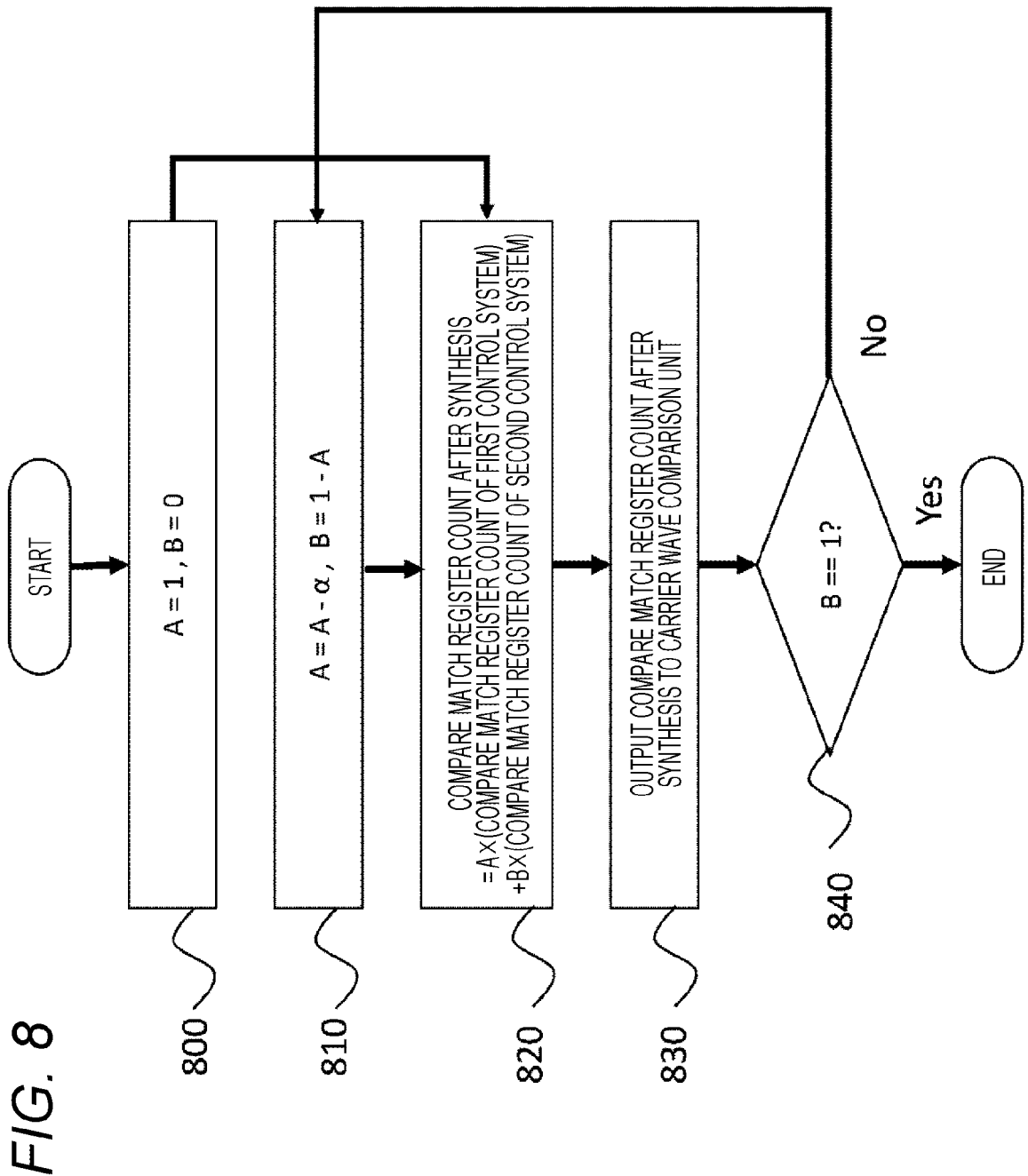
FIG. 8 is a flowchart of the process of generating a synthesized voltage command signal.

FIG. 8 is a flowchart of the process of generating a synthesized voltage command signal in the synthesis processing unit 670. The synthesis processing unit 670 sets the switching period by changing the modulation factor in the arithmetic control device INV200, and when the start point of the switching period is reached, the process illustrated in the flowchart of FIG. 8 is started.

In Step 800, the synthesis processing unit 670 sets the initial values of the coefficients A and B for the first and second voltage command signals input from the voltage command signal generation unit 620, respectively. Here, the initial value of the coefficient A for the first voltage command signal is 1, and the initial value of the coefficient B for the second voltage command signal is 0. After performing Step 800, the process proceeds to Step 820.

In Step 820, the synthesis processing unit 670 calculates the compare match register count after synthesis according to the current values of the coefficients A and B. Here, the values of the first and second voltage command signals output from the voltage command signal generation unit 620 are used as the compare match register counts of the first and second control systems, respectively. The coefficients A and B each are multiplied by the above values, and the multiplied values are added, so that the compare match register count after synthesis is calculated. When the process proceeds from Step 800 to Step 820, the coefficients A and B are set to the initial values of 1 and 0, respectively. Therefore, the compare match register count after synthesis is the same value as the compare match register count of the first control system.

In Step 830, the synthesis processing unit 670 outputs the compare match register count after synthesis calculated in Step 820 to the carrier wave comparison unit 680 as a synthesized voltage command signal.

In Step 840, the synthesis processing unit 670 determines whether the current value of the coefficient B is 1. When the current value of the coefficient B is 1, it is determined that the endpoint of the switching period has been reached, and the process illustrated in the flowchart of FIG. 8 is terminated. On the other hand, if the current value of the coefficient B is less than 1, it is determined that the switching period is still in progress, and the process returns to Step 810.

In Step 810, the synthesis processing unit 670 updates the values of the coefficients A and B, respectively. Here, the coefficient A is updated by subtracting a preset adjustment value α from the current value of the coefficient A using the adjustment value α, and the value of the updated coefficient A is subtracted from 1 to update the coefficient B. Here, the adjustment value α is a value of 0 or more and less than and is set according to the number of times the synthesis processing unit 670 outputs the synthesized voltage command signal during the switching period. For example, if the synthesized voltage command signal is output 10 times during the switching period, α=0.1 is set. As a result, the value of the coefficient A can be decreased as time elapses, and the value of the coefficient B can be increased as time elapses. By making the value of the adjustment value α variable, the number of outputs of the synthesized voltage command signal may be adjusted, and the length of the switching period may be adjusted accordingly.

After updating the values of the coefficients A and B in Step 810, the process proceeds to Step 820, and the compare match register count after synthesis is calculated using the updated values of the coefficients A and B. After that, the above process is repeatedly executed until it is determined in Step 840 that the value of the coefficient B becomes 1.

Next, the behavior of the PWM pulse and the voltage command signal at the time of switching between the conventional control system switching and the control system switching according to the present invention will be described below with reference to FIGS. 9 and 10. Further, FIGS. 9 and 10 illustrate examples of switching from the third harmonic superimposition PWM control system to the rectangular wave control system, but the same is true in the case of switching between other control systems.

Figure 9:
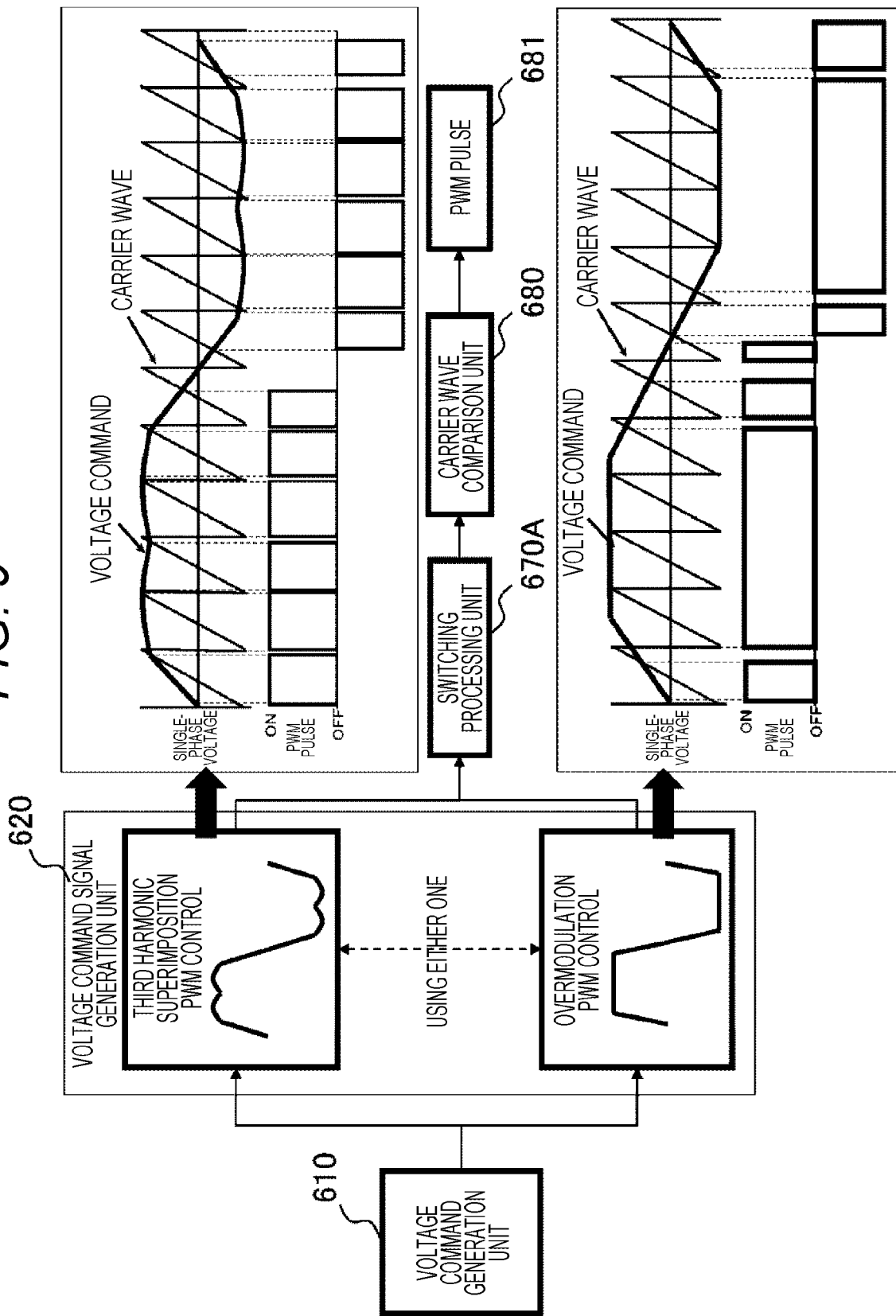
FIG. 9 is a diagram illustrating an example of the behavior of the PWM pulse and a voltage command signal when the conventional control system switching is performed.

FIG. 9 is a diagram illustrating an example of the behavior of the PWM pulse and the voltage command signal when the conventional control system switching is performed. As illustrated in FIG. 9, in the arithmetic control device that performs the conventional control system switching, a switching processing unit 670A that switches between two control systems is provided instead of the synthesis processing unit 670 of FIG. 6. In this conventional arithmetic control device, the voltage command signal generation unit 620 uses one of the third harmonic superimposition PWM control system or the rectangular wave control system based on the voltage command from the voltage command generation unit 610 respectively to generate a voltage command signal according to each control system. The switching processing unit 670A switches the control system by controlling the voltage command signal generation unit 620 to switch the control system used for generating the voltage command signal. The carrier wave comparison unit 680 performs PWM modulation by comparing the voltage command signal and the carrier wave, and outputs a PWM pulse 681 that forms a PWM signal.

In the conventional arithmetic control device described above, different voltage command signals are input to the carrier wave comparison unit 680 before and after switching the control system. Therefore, torque fluctuation occurs when the control system is switched.

Figure 10:
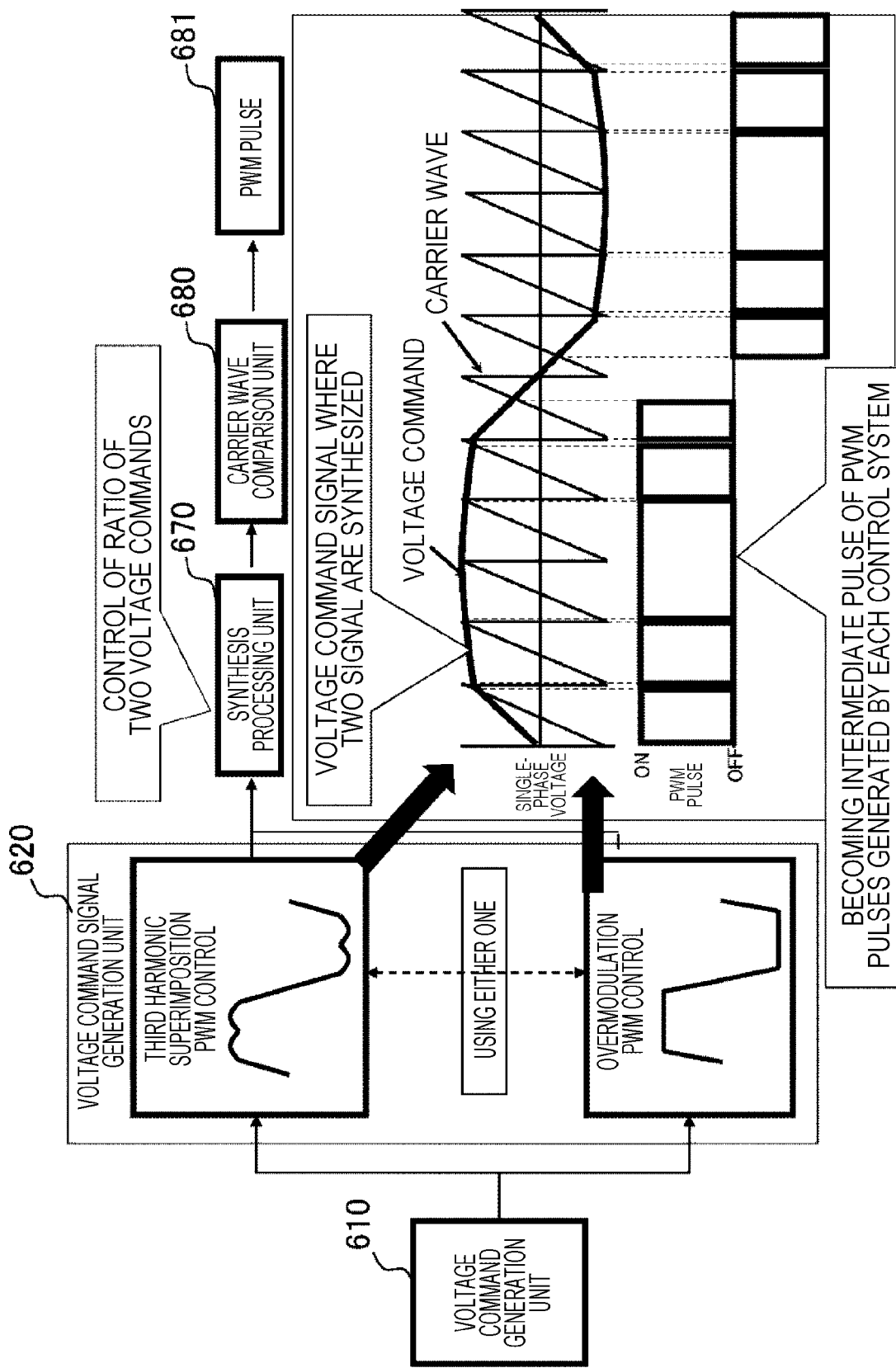
FIG. 10 is a diagram illustrating an example of the behavior of the PWM pulse and the voltage command signal when the control system switching according to the present invention is performed.

FIG. 10 is a diagram illustrating an example of the behavior of the PWM pulse and the voltage command signal when the control system switching according to the present invention is performed. As illustrated in FIG. 10, in the arithmetic control device INV200 of this embodiment, the voltage command signal generation unit 620 uses both the third harmonic superimposition PWM control system and the rectangular wave control system to generate the voltage command signal according to each control system based on the voltage command from the voltage command generation unit 610. The synthesis processing unit 670 switches the control system by controlling the ratios of the two types of voltage command signals output from the voltage command signal generation unit 620 and synthesizing the signals as described above. The carrier wave comparison unit 680 performs PWM modulation by comparing the synthesized voltage command signal output from the synthesis processing unit 670 with the carrier wave, and outputs the PWM pulse 681 that forms a PWM signal.

In the arithmetic control device INV200 of this embodiment described above, the two types of voltage command signals generated by the voltage command signal generation unit 620 are synthesized by the synthesis processing unit 670 and input to the carrier wave comparison unit 680. Therefore, when switching the control system, the difference between the two types of voltage command signals can be absorbed by the synthesis processing unit 670 to suppress torque fluctuations.

In the above embodiment, the voltage command signal generation unit 620 has a total of four control systems, that is, the sinusoidal PWM control 630, the third harmonic superimposition PWM control 640, the overmodulation PWM control 650, and the rectangular wave control 660, and two control systems are selected from these according to the modulation factor, but the present invention is not limited to this. For example, the voltage command signal generation unit 620 has only one of three control systems among the sinusoidal PWM control 630, the third harmonic superimposition PWM control 640, the overmodulation PWM control 650, and the rectangular wave control 660. Two control systems may be arbitrarily selected depending on the modulation factor. Alternatively, the voltage command signal generation unit 620 has only two control systems, and the two control systems may always be selected. In either case, the first and second voltage command signals generated by the voltage command signal generation unit 620 with the two control systems are synthesized by the synthesis processing unit 670 at a predetermined ratio respectively, so that a synthesized voltage command signal can be generated. When the carrier wave comparison unit 680 generates a PWM signal using this synthesized voltage command signal, it is possible to suppress fluctuations in voltage output due to switching of control systems and suppress torque fluctuations.

Further, in the above embodiment, an example of synthesizing two types of voltage command signals generated by the two control systems at the time of switching the control system has been described, but the voltage command signals may be synthesized at any other timing. An example thereof will be described below with reference to FIGS. 11 and 12.

Figure 11:
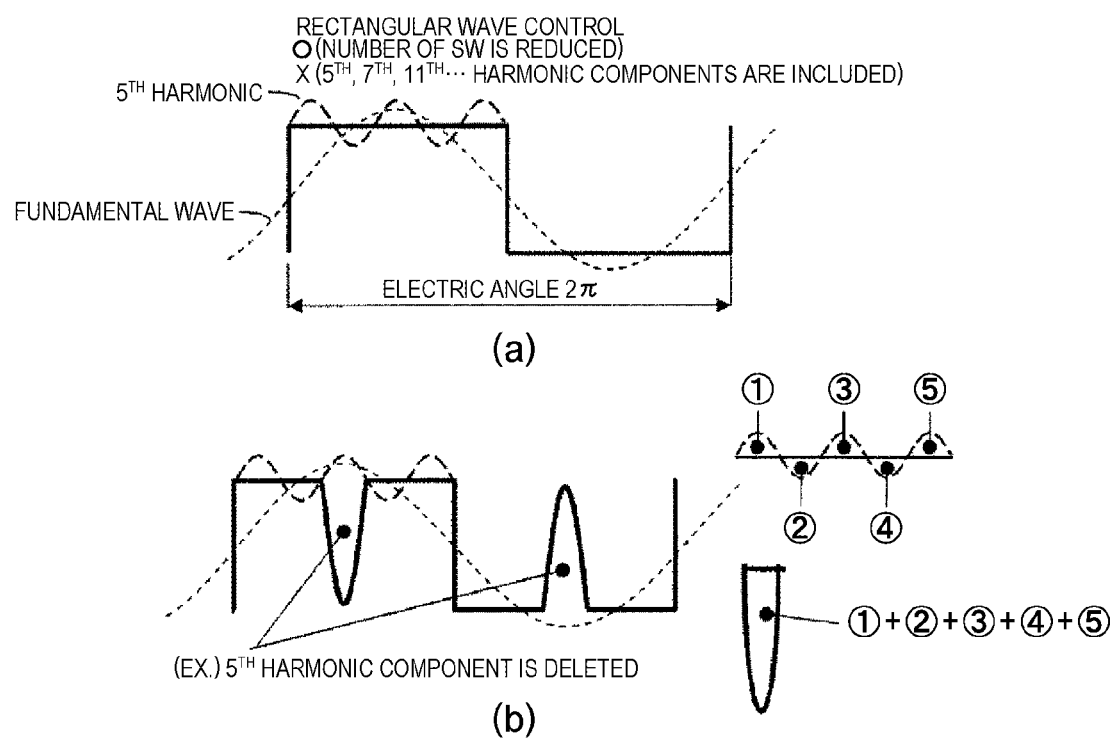
FIG. 11 is a diagram for explaining the method of removing a harmonic component in the voltage command signal.

FIG. 11 is a diagram, illustrating a method of removing a harmonic component in the voltage command signal. As illustrated in FIG. 11(a), for example, the rectangular modulated wave used when performing the rectangular wave control has the fifth, seventh, eleventh, harmonic components of each order with respect to a sine wave which is a fundamental wave. Here, as illustrated in FIG. 11(b), it is known that the fifth harmonic component can be removed from the rectangular wave by superimposing the modulated wave corresponding to the reversed-phase fifth harmonic component on the rectangular wave.

Figure 12:
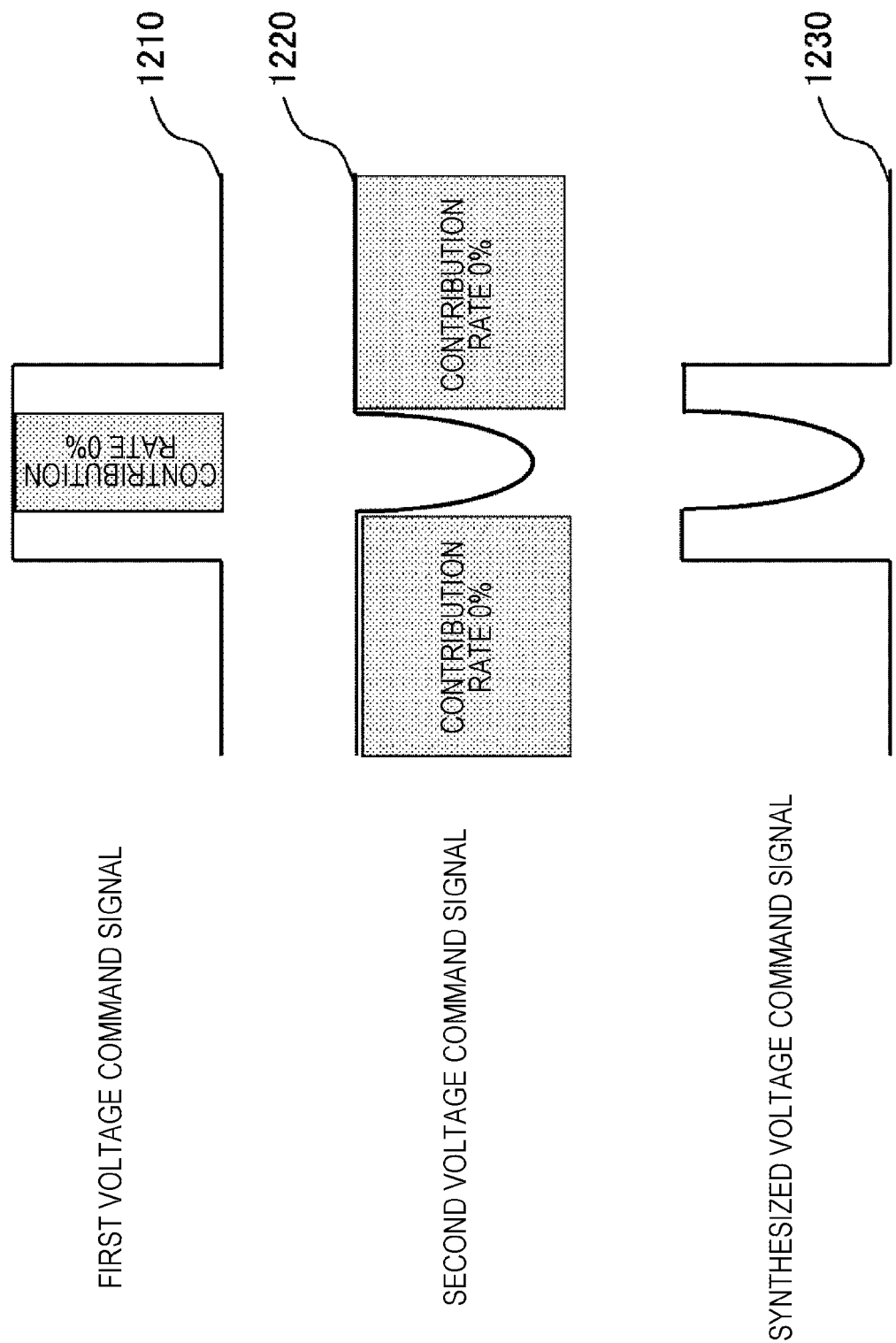
FIG. 12 is a diagram for explaining a realization example of the method of reducing a harmonic component according to an embodiment of the present invention.

In the arithmetic control device INV200 of this embodiment, the modulated wave by the original control system before removing the harmonic component is used as the first voltage command signal, and the modulated wave corresponding to the reversed-phase harmonic component to be removed is used as the second voltage command signal, so that it is possible to remove the harmonic components as described above. FIG. 12 is a diagram for explaining a realization example of a method for reducing harmonic components according to an embodiment of the present invention. For example, as illustrated in FIG. 12, a rectangular wave 1210 is used as the first voltage command signal, and a modulated wave 1220 corresponding to the reversed-phase fifth harmonic component is used as the second voltage command signal. Then, in the first voltage command signal, the contribution rate of the central portion of the rectangle is set to 0%, and in the second voltage command signal, the contribution rate of the portion excluding the central portion is set to 0%, and these voltage command signals are synthesized. At this time, the above-mentioned coefficients A and B, which are multiplied by the first and second voltage command signals, respectively, are set based on the harmonic to be removed by the second voltage command signal among the harmonics contained in the first voltage command signal. As a result, a modulated wave 1230 in which the fifth harmonic component is removed from the rectangular wave can be output as a synthesized voltage command signal.

According to the arithmetic control device INV200 of this embodiment, the PWM signal can be generated using the modulated wave in which the desired harmonic is removed by performing the above process at an arbitrary timing. By controlling the motor MG100 using this PWM signal, harmonics can be suppressed in the current flowing through the motor MG100. Although the example of removing the fifth harmonic component from the rectangular wave has been described above, it is possible to remove an arbitrary harmonic component from an arbitrary modulated wave by the same method.

According to the embodiments of the present invention described above, the following operational advantages are achieved.

(1) The inverter INV100 performs the power conversion operation for converting DC power into AC power, and includes the arithmetic control device INV200 which is provided with the voltage command signal generation unit 620, the synthesis processing unit 670, and the carrier wave comparison unit 680. The voltage command signal generation unit 620 has a plurality of control systems, and outputs the first voltage command signal generated based on the first control system among the plurality of control systems, and the second voltage command signal generated based on the second control system different from the first control system among the plurality of control systems. The synthesis processing unit 670 generates a synthesized voltage command signal obtained by synthesizing the first voltage command signal and the second voltage command signal at a predetermined ratio. The carrier wave comparison unit 680 generates a PWM signal which is a gate drive signal for controlling the power conversion operation based on the synthesized voltage command signal. With this configuration, it is possible to suppress torque fluctuations that occur in the motor MG100 when the control system is switched.

(2) The synthesis processing unit 670 generates a synthesized voltage command signal when the first control system is switched to the second control system. Specifically, the voltage command signal generation unit 620 switches from the first control system to the second control system when the modulation factor changes over a predetermined threshold. As illustrated in FIGS. 5 and 7 (*b*), the synthesis processing unit 670 generates a synthesized voltage command signal in a predetermined switching period including the timing at which the modulation factor crosses the threshold. With this configuration, when the control system is switched, the synthesized voltage command signal can be reliably generated and the torque fluctuation can be suppressed.

(3) The synthesis processing unit 670 may generate a synthesized voltage command signal when the first control system is not switched to the second control system. In this way, it is possible to generate a synthesized voltage command signal at an arbitrary timing.

(4) The synthesis processing unit 670 generates a synthesized voltage command signal by adding the value obtained by multiplying the first voltage command signal by the coefficient A, which is variable from 0 to 1, and the value obtained by multiplying the second voltage command signal by the coefficient B which is the value obtained by subtracting the coefficient A from 1 (Steps 810 to 830). With this configuration, the synthesis processing unit 670 can easily generate a synthesized voltage command signal in which the first voltage command signal and the second voltage command signal are synthesized at a predetermined ratio.

(5) The above coefficient A decreases as time elapses. With this configuration, the torque fluctuation can be reliably suppressed by making the transition of the control system continuous.

(6) As described with reference to FIG. 12, the above-mentioned coefficient A may be set based on a predetermined harmonic included in the first voltage command signal. In this way, any harmonic component can be suppressed in the current flowing through the motor MG100.

(7) The voltage command signal generation unit 620 includes at least two or more among the sinusoidal PWM control 630 that generates a voltage command signal using a sinusoidal modulated wave, the third harmonic superimposition PWM control 640 that generates a voltage command signal using a modulated wave in which the third harmonic is superimposed on the sine wave, the overmodulation PWM control 650 that generates a voltage command signal using a trapezoidal modulated wave, and the rectangular wave control 660 that generates a voltage command signal using a rectangular modulated wave, and can select two control systems from these according to the modulation factor. That is, one of the first control system and the second control system can be used as one of the sinusoidal PWM control 630, the third harmonic superimposition PWM control 640, and the overmodulation PWM control 650, and the other one of the first control system and the second control system can be used as the rectangular wave control 660. Further, one of the first control system, and the second control system may be used as one of the sinusoidal PWM control 630 and the third harmonic superimposition PWM control 640, and the other one of the first control system and the second control system may be used as the overmodulation PWM control 650. Further, one of the first control system and the second control system, may be used as the sinusoidal PWM control 630, and the other one of the first control system and the second control system may be used as the third harmonic superimposition PWM control 640. With this configuration, the present invention can be applied at the time of transition between arbitrary control systems, and torque fluctuation can be suppressed.

The above-described embodiment and modifications are described as merely exemplary. The present invention is not limited to the contents as long as the features of the present invention are not damaged. In addition, various embodiments and modifications have been described, but the present invention is not limited to these contents. Other embodiments considered within a scope of technical ideas of the present invention may also be included in the scope of the present invention.

REFERENCE SIGNS LIST

1 rotary electric motor drive system
610 voltage command generation unit
620 voltage command signal generation unit
630 sinusoidal PWM control
640 third harmonic superimposition PWM control
650 overmodulation PWM control 660 rectangular wave control
670 synthesis processing unit
680 carrier wave comparison unit
MG100 motor
C110 U-phase coil winding
C120 V-phase coil winding
C130 W-phase coil winding
N100 neutral point
R140 rotation angle sensor
INV100 inverter
INV200 arithmetic control device
INV300 drive circuit
INV400 power module
CT100 current sensor
TS100 temperature sensor
VCM100 host controller

The invention claimed is:

1. An inverter device for performing a power conversion operation to convert DC power to AC power, the inverter device comprising:
a voltage command signal generation circuit that includes a plurality of control systems and is configured to output a first voltage command signal generated based on a first control system among the plurality of control systems and a second voltage command signal generated based on a second control system different from the first control system among the plurality of control systems;
a synthesis processing circuit configured to generate a synthesized voltage command signal obtained by synthesizing the first voltage command signal and the second voltage command signal at a predetermined ratio; and
a carrier wave comparison circuit configured to generate a signal for controlling the power conversion operation based on the synthesized voltage command signal,
wherein the synthesis processing circuit is configured to generate the synthesized voltage command signal when the first control system is switched to the second control system,
wherein the synthesis processing circuit is configured to add a value obtained by multiplying the first voltage command signal by a variable coefficient of 0 or more and 1 or less, and a value obtained by multiplying the second voltage command signal by a value obtained by subtracting the coefficient from 1 so as to generate the synthesized voltage command signal, and
wherein the coefficient decreases as time elapses.

2. The inverter device according to claim 1, wherein
when a modulation factor changes over a predetermined threshold, the voltage command signal generation circuit is configured to switch from the first control system to the second control system, and
the synthesis processing circuit is configured to generate the synthesized voltage command signal in a predetermined switching period that includes a timing at which the modulation factor crosses the threshold.

3. The inverter device according to claim 1, wherein
one of the first control system and the second control system is one of a sinusoidal PWM control system that generates a voltage command signal using a sinusoidal modulated wave, a third harmonic superimposition PWM control system that generates a voltage command signal using a modulated wave in which a third harmonic is superimposed on a sine wave, and an overmodulation PWM control system that generates a voltage command signal using a trapezoidal modulated wave, and
another one of the first control system and the second control system is a rectangular wave control system that generates a voltage command signal using a rectangular modulated wave.

4. The inverter device according to claim 1, wherein
one of the first control system and the second control system is one of a sinusoidal PWM control system that generates a voltage command signal using a sinusoidal modulated wave or a third harmonic superimposition PWM control system that generates a voltage command signal using a modulated wave in which a third harmonic is superimposed on a sine wave, and
another one of the first control system and the second control system is an overmodulation PWM control system that generates a voltage command signal using a trapezoidal modulated wave.

5. The inverter device according to claim 1, wherein
one of the first control system and the second control system is a sinusoidal PWM control system that generates a voltage command signal using a sinusoidal modulated wave, and
another one of the first control system and the second control system is a third harmonic superimposition PWM control system that generates a voltage command signal using a modulated wave in which a third harmonic is superimposed on a sine wave.

6. An inverter device for performing a power conversion operation to convert DC power to AC power, the inverter device comprising:
a voltage command signal generation circuit that includes a plurality of control systems and is configured to output a first voltage command signal generated based on a first control system among the plurality of control systems and a second voltage command signal generated based on a second control system different from the first control system among the plurality of control systems;
a synthesis processing circuit configured to generate a synthesized voltage command signal obtained by synthesizing the first voltage command signal and the second voltage command signal at a predetermined ratio; and
a carrier wave comparison circuit configured to generate a signal for controlling the power conversion operation based on the synthesized voltage command signal,
wherein the synthesis processing circuit is configured to generate the synthesized voltage command signal when the first control system is switched to the second control system,
wherein the synthesis processing circuit is configured to add a value obtained by multiplying the first voltage command signal by a variable coefficient of 0 or more and 1 or less, and a value obtained by multiplying the second voltage command signal by a value obtained by subtracting the coefficient from 1 so as to generate the synthesized voltage command signal, and
wherein the coefficient is set based on a predetermined harmonic included in the first voltage command signal.

* * * * *